B. S. JOHNSON.
FRICTION GEAR.
APPLICATION FILED SEPT. 29, 1919.
1,372,698.
Patented Mar. 29, 1921.
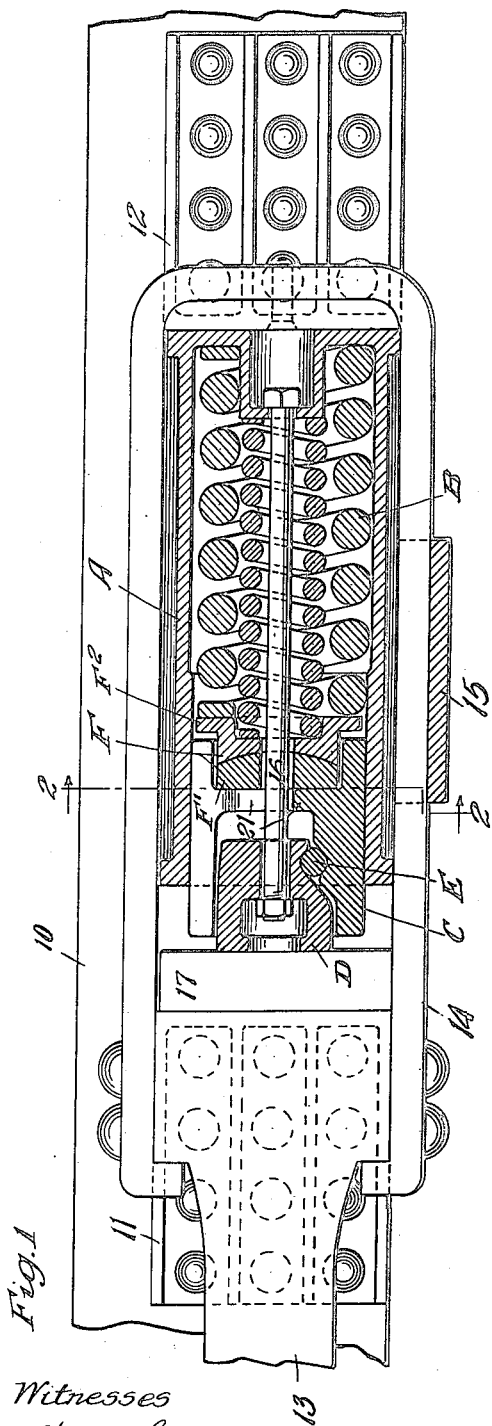
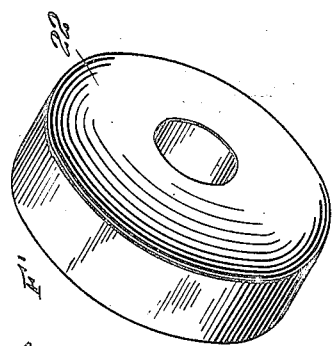
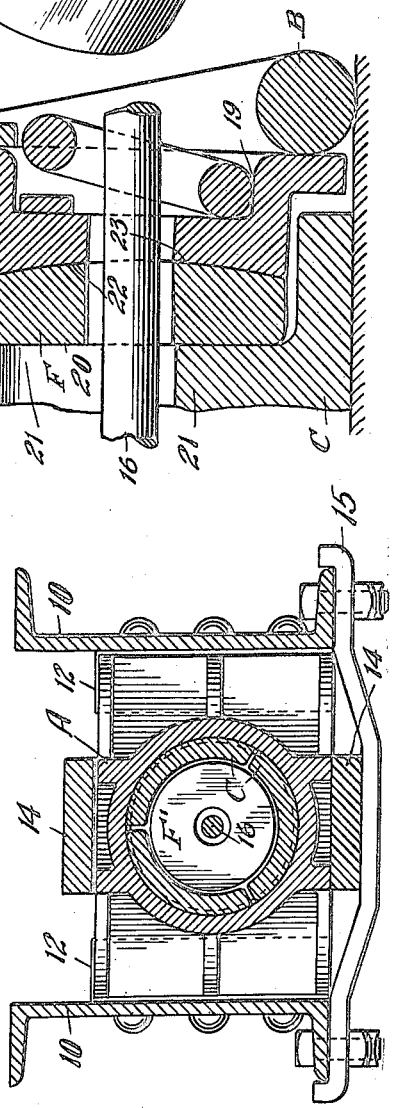
Witnesses
Wm. Geiger
Inventor
Bradley S. Johnson
By Geo. I. Haight
His Atty

UNITED STATES PATENT OFFICE.

BRADLEY S. JOHNSON, OF CHICAGO, ILLINOIS, ASSIGNOR TO WILLIAM H. MINER, OF CHAZY, NEW YORK.

FRICTION-GEAR.

1,372,698. Specification of Letters Patent. Patented Mar. 29, 1921.

Application filed September 29, 1919. Serial No. 327,143.

*To all whom it may concern:*

Be it known that I, BRADLEY S. JOHNSON, a citizen of the United States, residing at Chicago, in the county of Cook and State of Illinois, have invented a certain new and useful Improvement in Friction-Gears, of which the following is a full, clear, concise, and exact description, reference being had to the accompanying drawings, forming a part of this specification.

This invention relates to improvements in friction gears.

In the art of friction shock absorbing mechanism, particularly those utilized as gears in railway draft riggings, it is well known that the heavy springs employed have their ends or tangs tapered in order to obtain as flat an end for the spring as possible. Notwithstanding the tapered ends or tangs of the springs, it has been found practically impossible to obtain a perfectly true flat bearing for a follower at the end of the spring in a plane at right angles to the axis of the spring. Where these springs are employed in conjunction with a circularly arranged series of friction shoes as in the well-known type of "Miner friction gear," there is a tendency for a greater resistance to be presented to some of the friction shoes than to others due to the uneven bearing of the spring follower interposed between the ends of the shoes and the end of the spring or springs. Obviously the unbalanced resistance to the movement of the friction shoes, above mentioned, results in an impaired efficiency in the operation of the device. Because of the heavy material of which the springs are necessarily made, it is impossible to obtain commercially a true flat bearing at the end of the spring for the entire circumference.

The object of my invention is to provide means for obtaining a balanced pressure or resistance or bearing between the end of the spring resistance and elements of the friction shock absorbing mechanism.

In the drawing forming a part of this specification, Figure 1 is a vertical longitudinal sectional view of a portion of a railway draft rigging showing my improvements in connection therewith. Fig. 2 is a vertical transverse sectional view taken substantially on the line 2—2 of Fig. 1. Fig. 3 is an enlarged detail sectional view to more clearly illustrate the operation of my invention, the displacement of certain of the parts being considerably exaggerated in order to more clearly illustrate the invention. And Fig. 4 is a detail perspective of one of the sections of the improved follower employed in my invention.

In the drawing, 10—10 denote the draft sills of a railway car to which are secured front and rear stops 11 and 12, of usual construction. A section of the draw bar is indicated at 13, the same being operatively connected to the friction shock absorbing mechanism by a yoke 14 of well-known form, the parts being supported by a saddle plate 15. The shock absorbing mechanism, as shown, comprises a combined friction shell and spring cage A, a double coil main spring B, a circularly arranged series of friction shoes C, a wedge D, anti-friction rollers E, and my improved follower interposed between the spring and shoes designated generally by the reference F. The parts of the friction gear are held in assembled relation by a bolt 16 and a front follower 17 is interposed between the draw bar and the wedge D.

The general arrangement of the friction mechanism is well known and one which is in extensive use. The friction shell proper is of course of cylindrical form and the shoes have cylindrical outer friction surfaces coöperable with the interior surface of the shell and the wedge is of triangular form so as to exert a three-point spreading action on the shoes. It is of course highly desirable that the spring resistance to the movement of the friction shoes be equal so as to obtain the maximum efficiency of the device. To accomplish this result, I employ the follower F constructed as follows:

The spring follower F is preferably made in two parts designated $F^1$ and $F^2$. The latter has sufficient area to bear against the spring for the entire circumference and where the spring is of the double coil type, as shown in the drawing, the section $F^2$ will have preferably a flange 18 to seat against the outer coil and a socket 19 to form a seat for the inner coil. The other section $F^1$ of the follower is in the form of a heavy disk or washer having an outer flat or plain surface 20 adapted to bear against inwardly extending shoulders 21—21 on the shoes. The sections $F^1$ and $F^2$ are provided with coöperating bearing surfaces 22 and 23 of spherical form so as to provide, in effect, a universal joint between the two sections and thus permit relative adjustment in any direction between the two. In the construction shown, the convex surface 22 is on the section F¹ and the corresponding concaved surface is on the section F² of the follower F. As clearly shown in Fig. 3, both sections of the follower F are suitably apertured at their centers to accommodate the bolt 16 and permit of the necessary relative movement between the sections F¹ and F².

With the construction shown, it is evident that the inner part F² of the spring follower can obtain a full bearing on the end of the spring and that the general plane of the section F² may be either perpendicular to the axis of the spring or at an angle thereto. Regardless of the angle of the general plane of the section F² with respect to the axis of the spring and also the axis of the friction gear as a whole, the other section F¹ of the follower can and will extend in a general plane at true right angles to the said axis and perpendicular to the friction surface of the shell and at the same time pressure be fully transmitted between the two sections F¹ and F². In this manner, a uniform resistance is applied to all three of the friction shoes thus obtaining a uniform friction action from all the shoes and regardless of the particular position which may be assumed by the part of the follower directly in contact with the main spring.

The construction disclosed is exceedingly simple, relatively inexpensive to manufacture and does not affect the over-all dimensions of the shock absorbing mechanism. The construction which I have herein shown and described is the one preferred but it will be evident to those skilled in the art that the invention may be embodied in various other constructions and all such constructions are contemplated as come within the scope of the claims appended hereto.

I claim:

1. In a friction shock absorbing mechanism, the combination with a friction shell, a plurality of friction elements, and a spring to yieldingly resist relative movement between said shell and elements; of a follower interposed between the friction elements and spring and adapted to transmit pressure therebetween, said follower comprising relatively adjustable parts to compensate for inequalities at the bearing end of the spring.

2. In a friction shock absorbing mechanism, the combination with a friction shell, a plurality of friction elements, and a spring to yieldingly resist relative movement between said shell and elements; of a follower interposed between said friction elements and spring, said follower comprising two parts having universal adjustment therebetween.

3. In a friction shock absorbing mechanism, the combination with a cylindrical friction shell, of three friction shoes arranged in a circular series within and cooperable with said shell, a wedge cooperable with the shoes, a spring for resisting relative movement between the shoes and shell, and a follower interposed between said spring and three shoes, said follower consisting of one section in bearing contact with all three shoes and another section in bearing contact with the end of the spring, the sections being relatively adjustable.

4. In a friction shock absorbing mechanism, the combination with a friction member; a plurality of friction elements cooperable with said member, and a spring to yieldingly resist relative movement between said member and elements; of a follower located between the friction elements and the spring and employed in the transmission of pressure between the spring and said elements, said follower comprising relatively adjustable parts to automatically compensate for inequalities at the adjacent bearing end of the spring.

In witness that I claim the foregoing I have hereunto subscribed my name this 15th day of Sept. 1919.

BRADLEY S. JOHNSON.